United States Patent [19]
Oh

[11] Patent Number: 5,134,970
[45] Date of Patent: Aug. 4, 1992

[54] BIRD'S NEST

[76] Inventor: Jung C. Oh, 107-607, Hyundai, Apt. Ung Bong-Dong, Sungdong-Ku, Seoul, Rep. of Korea, 133-080

[21] Appl. No.: 798,511

[22] Filed: Nov. 26, 1991

[30] Foreign Application Priority Data

Dec. 20, 1990 [KR] Rep. of Korea .......... 20364/1990[U]
May 24, 1991 [KR] Rep. of Korea ............ 7435/1991[U]
May 28, 1991 [KR] Rep. of Korea ............ 7671/1991[U]

[51] Int. Cl.$^5$ ............................................. A01K 31/00
[52] U.S. Cl. ............................................................. 119/23
[58] Field of Search ....................... 119/17, 19, 21, 23; D30/108, 110, 111, 112, 121, 124, 126

[56] References Cited

U.S. PATENT DOCUMENTS

| | | | |
|---|---|---|---|
| 3,130,706 | 4/1964 | Myaida et al. | 119/23 |
| 3,182,634 | 5/1965 | Myaida et al. | 119/23 |
| 3,295,498 | 1/1967 | Brown | 119/23 |
| 3,496,912 | 2/1970 | Cockrell | 119/23 |
| 4,173,200 | 11/1979 | Olsen et al. | 119/23 |

*Primary Examiner*—Gene Mancene
*Assistant Examiner*—Thomas Price

[57] ABSTRACT

A bird's nests comprising a box-shaped body having a roof, a hole provided at each corner of said roof, a first entrance and a second entrance provided at an upper part and at a lower part of a front side of the body, side plates fitted to both sides of the body, a slit formed under the first entrance, and a pair of guide rail rearwardly extending from both ends of the slit; a panel which has at least one divided feed bucket slidably inserted into the slit; an inner wall vertically extending from a rear surface of the front side of the body; a bottom plate mounted at a lower portion of the body; a hanging bracket provided at a rear side of the body; means for slidably fitting both sides of the body with the side plates; and a hanger for hanging the nest on trees. The bird's nest according to the invention has advantages in that parent birds, during the laying and brooding on eggs period, can access to the feed buckets easily thereby preventing the birds from malnutrition, and that the nest is capable of installing both in a cage and on the trees of the fields.

3 Claims, 4 Drawing Sheets

BIRD'S NEST

BACKGROUND OF THE INVENTION

1. Field of the Invention

The present invention relates to a bird's nest, and more particularly to a bird's nest capable of preventing malnutrition in case of bird's nests installed in cages or on trees, birds can not easily eat food, thereby protecting the birds from malnutrition during the laying and brooding on eggs period.

2. Description of the Prior Art

Conventionally, known bird's nests are designed to have at their inner bottom a cavity formed therein which is a depressed portion for restraining an injurious animal from looking or invading the nest so that parent birds can comfortably brood on eggs gathered in the center of the inner bottom.

However, the known bird's nest are not provided with a feed bucket so that the parent birds can not easily eat feed due to brooding on the eggs during the laying and brooding on the eggs period. Thus, the known nest has a disadvantage in that it causes the parent birds in brooding on the eggs to sometimes suffer from malnutrition or become even starved to death.

Additionally, the bird's nests may be taken care of under a caretaker when the bird's nests are installed in a cage, but the bird's nests can not be easily taken care under a caretaker when the bird's nests are installed on trees of a garden or fields.

SUMMARY OF THE INVENTION

It is, therefore, the primary object of the present invention to provide a bird's nest which can overcome the aforementioned disadvantages, which is provided with food buckets detachably mounted thereon so that the parent birds which have difficulty to move during the laying and brooding on eggs period can easily approach the food buckets for eating the feed in the food buckets without difficulty, and which are capable of installing both in a cage and on the trees of the fields.

In order to achieve the above object, the bird's nest according to the present invention comprise a box-shaped body having a roof, a hole provided at each corner of said roof, a first entrance provided at an upper part of a front side of said body, a second entrance provided at a lower part of the body, side plates fitted to both sides of the body, a slit formed under said first entrance, and a pair of guide rail rearwardly extending from both ends of said slit; a panel slidably inserted into the body by being inserted into the slit and guided by said guide rails, said panel having at least one divided feed bucket at a front end thereof; an inner wall vertically extending from a rear surface of the front side of the body; a bottom plate mounted at a lower portion of the body by a plurality of screws; a hanging bracket provided at a rear side of the body; means for slidably fitting both sides of the body with the side plates; and a hanger for hanging said nest on trees, said hanger being connected to said holes.

BRIEF DESCRIPTION OF THE DRAWINGS

The above and other objects and features of the present invention will appear fully hereinafter from a consideration of the following description taken in connection with the accompanying drawings wherein one example is illustrated by way of example, in which:

FIG. 2b is a side sectional view of the assembled bird's nest of FIG. 2a;

DETAILED DESCRIPTION OF THE PREFERRED EMBODIMENTS

Figure 1:
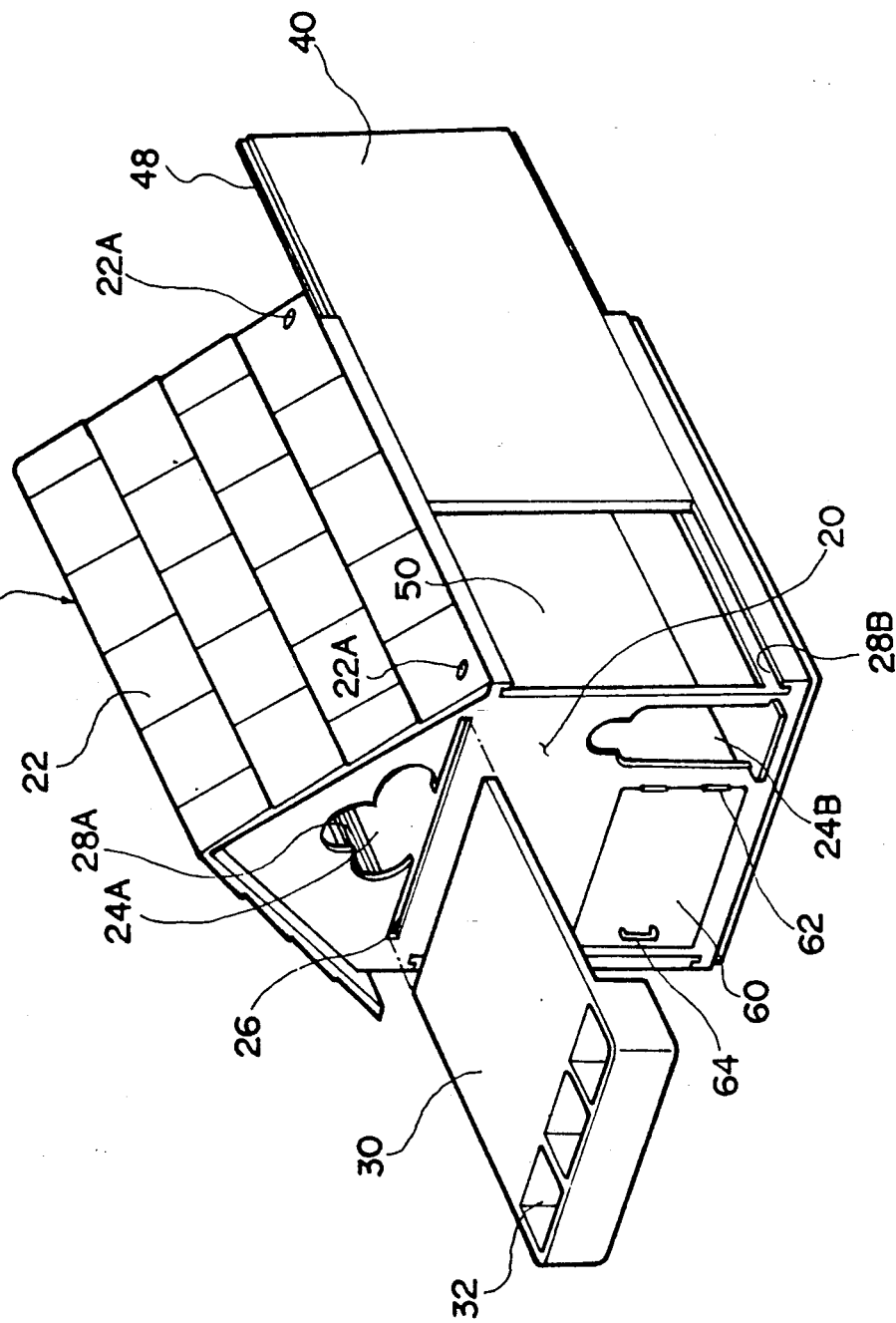
FIG. 1 is an exploded perspective view of a bird's nest according to an embodiment of the present invention.
Figure 2A:
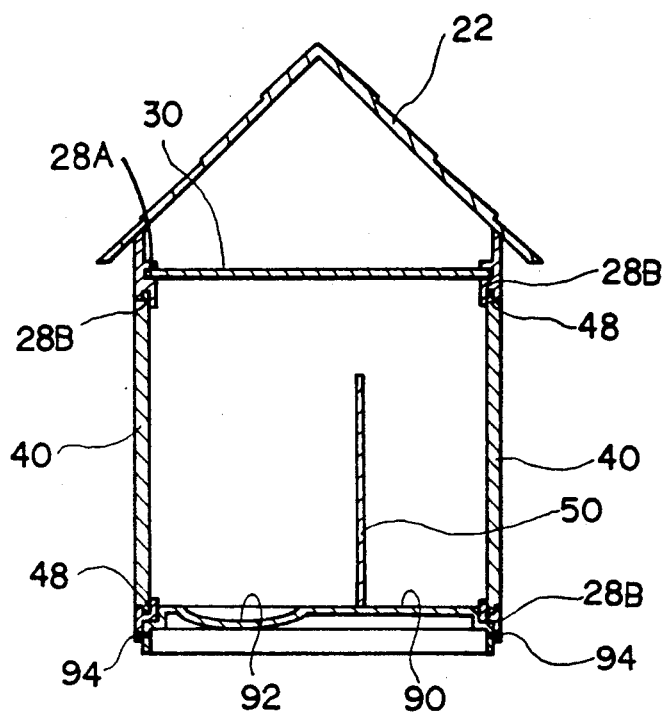
FIG 2a is a front sectional view of the bird's nest of FIG. 1, after being assembled.
Figure 2B:
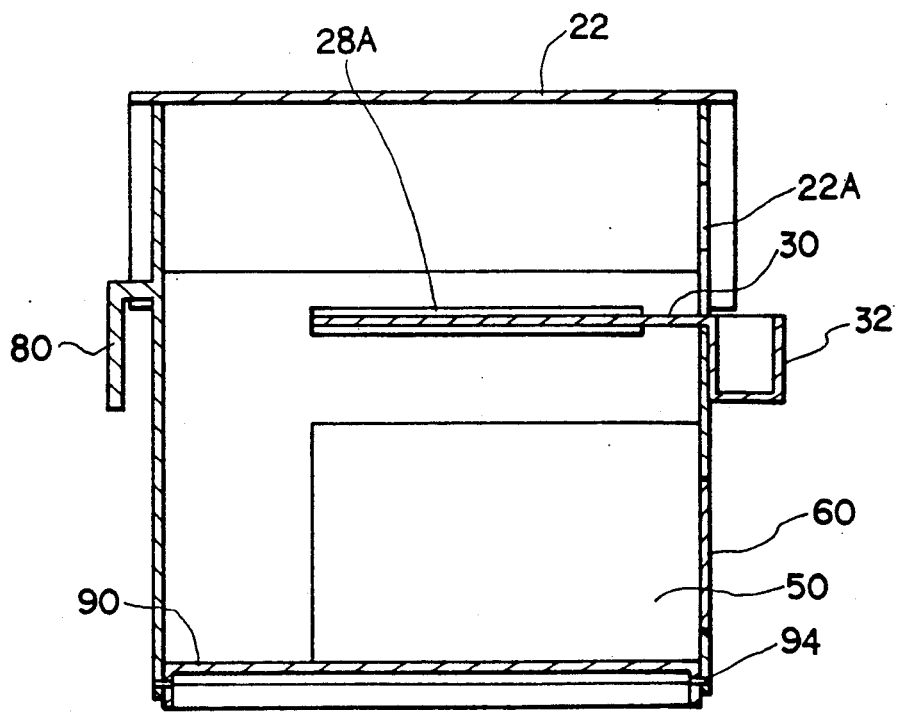

Referring to FIG. 1, there is shown an exploded perspective view of the bird's nest according to the present invention. Referring to FIGS. 2a and 2b, there are also shown a front sectional view and a side sectional view of the assembled bird's nest of the present invention. As shown in the drawings, the bird's nest 10 comprises a box-shaped body 20 having a rood 22 disposed at a top thereof, a first entrance 24a formed at an upper part of a front side of the box-shaped body 20, a slit 26 formed under the first entrance 24a, a pair of guide rails 28a inwardly extending from opposite sides of the slit 26, and a panel 30 having at least one divided feed buckets 32 at a front end thereof and slidably inserted in the slit 26.

Formed at upper and lower parts of both sides of the body 20 are guide rails 28b. A pair of side plates 40 each is slidably fitted between a pair of the guide rails 28b. The side plates 40 may be adapted for being used as a plate showing an information and an advertisement, as required. For this reason, the each side plate 40 is provided with a pair of guide rib 48 at upper and lower ends thereof.

Also, the front side of the body 20 is formed with a second entrance 24b at a lower part thereof. The body 20 is provided therein with an inner wall 50 having the same length as that of the panel 30 so as to hide the inside thereof.

A door 60 is mounted on a lower part of the front side of the body 20 by means of a hinge 62 so as to take out eggs and take care of chicks. A handle 64 is also attached to the door 60.

On a rear side of the body 20, a hanging bracket 80 is provided, which bracket 80 is adapted to hang the nest 10 on a inner wall of a cage.

A bottom plate 90 which has a depressed portion 92 at a center thereof is fitted at a lower part of the body 20 by means of a plurality of screws 94.

Figure 3A:
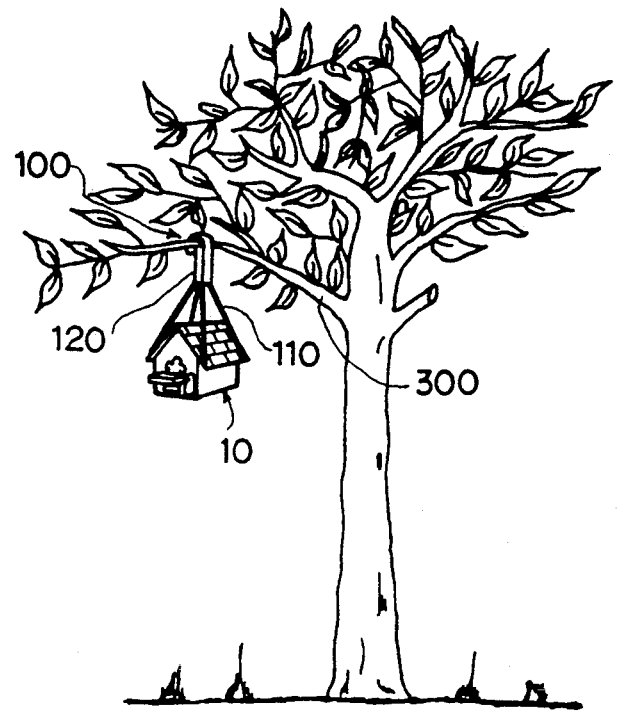
FIG. 3a is a schematic view illustrating the bird's nest of the present invention suspended from a tree by hanger.
Figure 4:
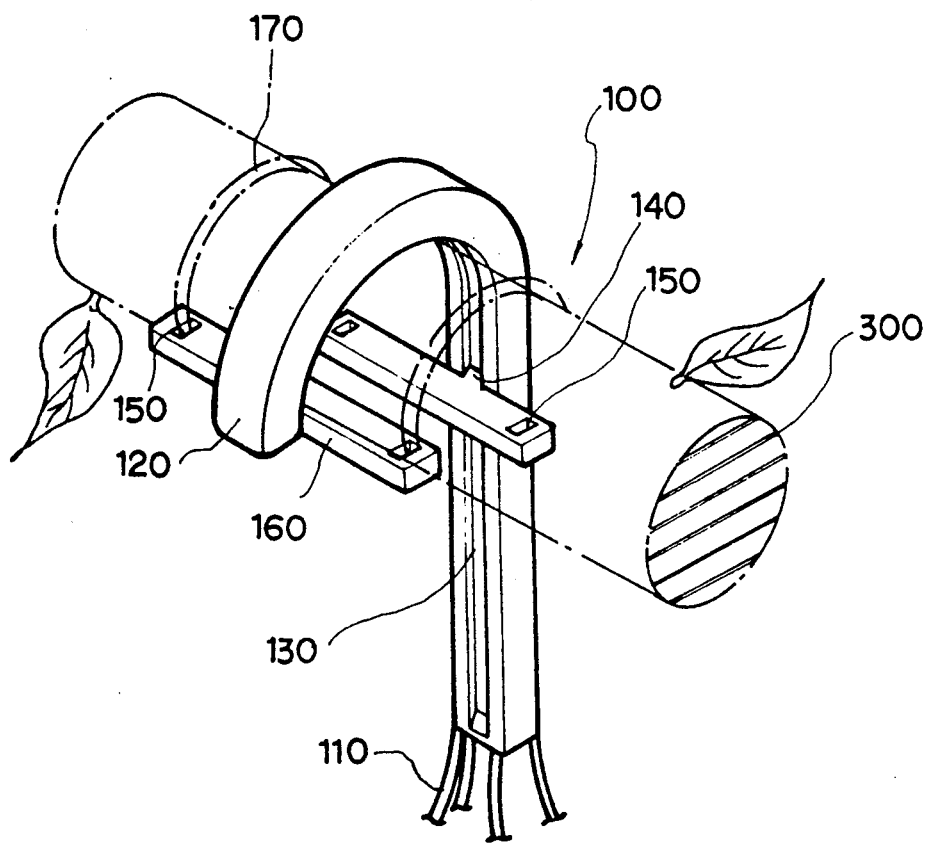
FIG. 4 is an enlarged perspective view of the hanger of the bird's nest according to the invention.

As illustrated in FIG. 3a and FIG. 4, the bird's nest may be suspended from a branch of a tree in such a way that a hanger 100 fitted in holes 22A formed at corners of the roof 22 is hung on the branch of the tree. In concrete terms, the hanger 100 has at one end thereof legs 110 being fixed in holes 22A of the roof 22 and has hook 120 at the other end thereof, a dovetail groove 130 is formed at an inside of the hook 130 therealong. Also, a pair of support bars 160 is provided, each of which has a dovetail 140 being slidably fixed in the dovetail groove 130, and having a pair of binding holes 150 at both ends thereof.

Alternatively; even though it is not described in the accompanying drawings, a dovetail groove may be formed on the rear side of the body 20, and a dovetail which is connected to an end of a binding band is slidably fitted in the dovetail groove so that the nest 10 may be directly fixed on a trunk of the tree.

As illustrated in the drawings, and particularly to FIG. 1, FIG. 2A and FIG. 2B, since the panel 30 is provided at a front end thereof with the feed buckets 32 and the panel 30 is inserted in the slit 26 formed under the first entrance 24A, parent birds in the nest 10 can easily eat feed contained in the feed buckets 32 through the first entrance 24A during the laying the brooding on eggs period, thereby preventing the birds from malnutrition. When the parent birds brood on eggs, the panel 30 serves as a sunshade for intercepting light from the first entrance 24A, and the inner wall 50 also serves as a sunshade for intercepting the light from the second entrance 24B.

In addition, the side plate 40 may be slidably fitted between a pair of the guide rail 28B by engaging guide rib 48 of the side plate 40 with the guide rail 28B so that the outer side of the side plate 40 may serve as an information and advertisement board.

Figure 3B:
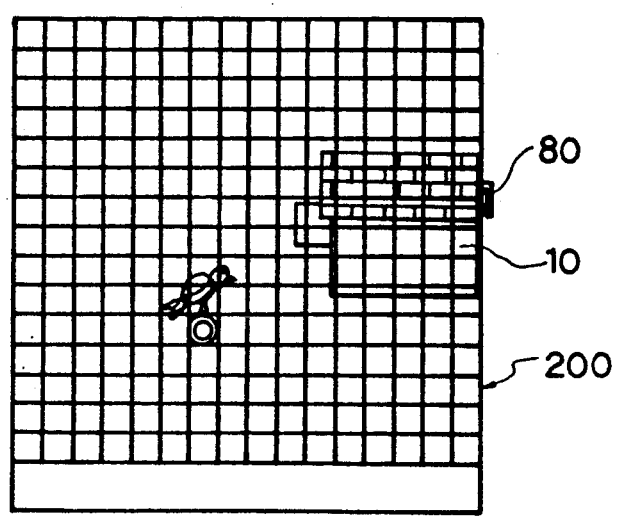
FIG. 3b is a schematic view illustrating the bird's nest of the present invention installed n a cage.

As illustrated in FIG. 3B, the nest 10 may be hung on an inner side of the cage 200 by hanging the hanging bracket 80 on a wire of the inner side. Alternatively, as illustrated in FIG. 3A, the nets 10 may be suspended from the branch 300 of the tree of a garden or a field by means of the hanger 100.

Referring next to FIG. 4, when the nest 10 is installed on a tree, the support bar 160 is properly positioned along the dovetail groove 130 by means of the dovetail 140 depending on a thickness of a branch 300, and then the branch 300 is bound with the binding band 170 through the binding hole 150. Therefore, the hook 120 of the nest 10 may be fixed on the branch 300 regardless of small or large thickness of the branch 300.

As described hereinbefore, the bird's nest according to the present invention may be made of synthetic resin by an appropriate method such as an injection molding, and particularly may be used for both a cage and a tree of the fields. Therefore, even if the nest 10 has been installed in a cage for a certain period and thereafter is installed on a tree of the fields, the birds familiar to the circumstance of the nest will habitually return to the nest installed on a tree of the fields after the birds play at other place.

In addition to the above advantages, the bird's nest according to the present invention has another advantage in that it has food buckets mounted thereon, thereby preventing birds from malnutrition during the period for laying and brooding on eggs.

It is further understood by those skilled in the art that the foregoing description is a preferred embodiment of the disclosed bird's nest and that various changes and modifications may be made in the invention without departing from the spirit and scope thereof.

What is claimed is:

1. A bird's nest comprising:

a box-shaped body having a rood, a hole provided at each corner of said roof, a first entrance provided at an upper part of a front side of said body, a second entrance provided at a lower part of the body, side plates fitted to both sides of the body, a slit formed under said first entrance, and a pair of guide rails rearwardly extending from both ends of said slit;

a panel slidably inserted into the body by being inserted into the slit and guided by said guide rails, said panel having at least one divided feed bucket at a front end thereof;

an inner wall vertically extending from a rear surface of the front side of the body;

a bottom plate mounted at a lower portion of the body by a plurality of screws;

a hanging bracket provided at a rear side of the body;

means for slidably fitting both sides of the body with the side plates; and a hanger for hanging said nest on trees, said hanger being connected to said holes.

2. A bird's nest according to claim 1, wherein said means for slidably fitting both sides of the body with the side plates comprises a pair of horizontal guide rails formed at an upper portion and a lower portion of a side of the body and a pair of guide ribs horizontally formed on an upper end and a lower end of the side plate, respectively.

3. A bird's nest according to claim 1 or claim 2, wherein said hanger comprises a hook provided at one end, a plurality of legs provided at the other end, said hook including an inner side being formed therealong with a dovetail groove, and a pair of support bars each having a dovetail at a center portion thereof for being slidably disposed in said dovetail groove and a pair of binding holes formed at both ends thereof.

* * * * *